April 26, 1927.

C. E. LUCKE 1,626,202

INTERNAL COMBUSTION ENGINE

Original Filed March 17, 1920

Inventor
Charles E. Lucke
By his Attorneys
Philipp Sawyer Rice & Kennedy

Patented Apr. 26, 1927.

1,626,202

UNITED STATES PATENT OFFICE.

CHARLES E. LUCKE, OF NEW YORK, N. Y., ASSIGNOR TO WORTHINGTON PUMP AND MACHINERY CORPORATION, OF NEW YORK, N. Y., A CORPORATION OF VIRGINIA.

INTERNAL-COMBUSTION ENGINE.

Application filed March 17, 1920, Serial No. 366,511. Renewed September 17, 1926.

This invention relates to the feeding and vaporizing or gasifying of fuel in internal combustion engines, and is particularly applicable to that class of engines operating on the Diesel or constant pressure system.

The especial object of the invention is to provide an apparatus and method employing solid injection of the oil or other liquid or solid fuel, as distinguished from spraying the fluid by compressed air, by which the proper feed of the fuel to the cylinder for securing the maximum power and economy may be attained. The specific means used for this purpose falls within the class of precombustion fuel supply by which partial combustion occurs in a precombustion chamber communicating with the cylinder, and the fuel is gradually fed to the cylinder by the relative pressures in the precombustion chamber and cylinder, and I aim particularly to control the time, rate and amount of combustion in the precombustion chamber independently of the rate of pump injection, and thus control the character and rate of fuel feed to the cylinder, so as to secure the results desired.

The oil is injected during or about the end of the compression, and preferably just before or at the end of the compression stroke and so as to continue somewhat after reversal, and the injection is in a solid stream without spraying against a hot splash surface or plate near and preferably extending about the opening from the precombustion chamber into the cylinder.

The oil is preferably injected from the side of the precombustion chamber opposite the cylinder opening, and the breaking up of the solid stream in crossing the precombustion chamber is prevented by injection through a tube terminating at such small distance from the splash surface as to secure the desired splash effect and limitation of the distribution of the fuel to a portion of the precombustion chamber.

The oil is vaporized or gasified to some extent by injection against the hot splash surface, after operation is started, and the construction is such as to secure the combustion required to maintain the surface against which the oil is injected and splashed at the required high temperature for prompt ignition and combustion, the time of injection being after the air has been compressed to igniting temperature. The oil may be injected directly into a cup-shaped port plug carrying the restricted openings by which the precombustion chamber opens into the cylinder, and this cup shaped plug may be expanded so as to cover a considerable portion of the wall of the precombustion chamber about the cylinder opening, so as to secure a better distribution of the oil in the inner part of the precombustion chamber. In many cases, it may be desirable to provide the cylinder end of the tube with a flange, or otherwise provide a guard about the end of the tube which shall restrict the distribution of the oil through the rear part of the precombustion chamber and thus limit the amount of air brought into contact with the oil and thus restrict the combustion therein.

For a full understanding of the invention, a detailed description of constructions embodying and for carrying out the invention in the best form now known to me, will now be given in connection with the accompanying drawings forming a part of this specification, and the features forming the invention then specifically pointed out in the claims.

In the drawings—

Figure 1:
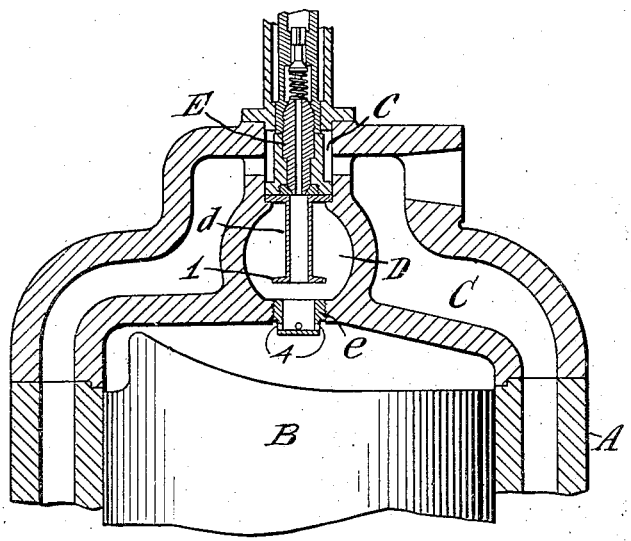
Figure 1 is a central section through the cylinder head, precombustion chamber and oil injection nozzle, showing the piston in elevation, the engine being shown as of the two-cycle type.

Referring now particularly to Fig. 1, A is the engine cylinder; B is the piston; C the cooling or water jacket; D the precombustion chamber, and E the oil injection nozzle mounted on the cylinder head and through which the oil is forced in through a suitable pump, this oil injection being shown as of a well known type adapted to deliver the oil in a solid stream, but it will be understood that any other suitable form of nozzle securing similar results may be used. The nozzle is jacketed, as usual, by extension c of cylinder jacket C.

The tube d, through which the injection nozzle E delivers, is shown in Fig. 1, as a straight tube extending well across the precombustion chamber toward the cylinder end and having at its cylinder end a flange 1, so that the back splash of the injected oil will be restricted and the oil will not splash directly into the outer part of the precombustion chamber.

The cylinder head is provided with an opening, preferably opposite the open end of tube d, as shown, which opening receives a port plug e forming a cup having its open end toward the precombustion chamber, and is closed to the cylinder except for small ports 4, preferably arranged on the side of the plug, as shown, so that the oil will not be injected directly into the cylinder, but permit the passage of and distribute the fuel as fed by the flow of vapor and air from the precombustion chamber toward the cylinder.

As shown in Fig. 1, the oil is injected through the tube d directly against the cylinder end of this plug, and splashes back into the cup of the plug and the inner part of the precombustion chamber.

Figure 2:
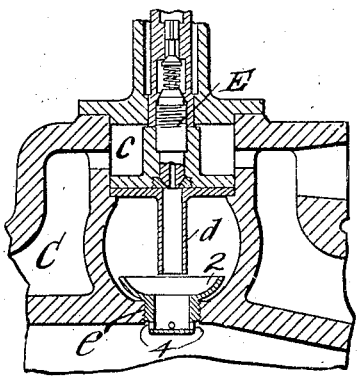
Figures 2 and 3 are partial sections corresponding to Fig. 1, showing certain modifications.

The construction shown in Fig. 2 is the same as that shown in Fig. 1, except that the tube d is not provided with the flange 1, and the cup of the plug e is flared outwardly within the combustion chamber forming a larger cup 2, the wall of which is preferably separated from the cooled cylinder wall, so as to maintain the high heat desirable. In this construction the splash back of the oil is not restricted as much as in the construction shown in Fig. 1, but the air in the rear portion of the combustion chamber will not be brought in contact with the oil, or at least not to the same extent as near the cylinder opening.

Figure 3:
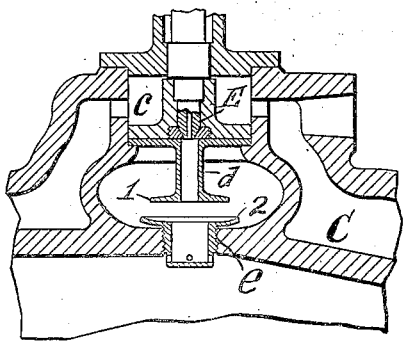

The construction shown in Fig. 3, is the same as that shown in Fig. 1, except that the precombustion chamber is flattened, so as to widen the space about the cylinder opening and decrease the depth of the chamber. The tube d is correspondingly shortened, the flange 1 widened, and the enlarged or flared cup 2 of the port plug is used, as in Fig. 2.

The operation of the construction is as follows: The oil is injected from nozzle E through tube d in a solid unbroken stream and, as it passes through the hot air in chamber D and strikes the hot splash surface of port plug e, it splashes back and is partially vaporized and partial combustion follows in the inner or cylinder end of the combustion chamber, the contact of the air in the precombustion chamber with the fuel being limited in Figs. 1 and 3 by the flange 1, and in Fig. 2 by the position and dimensions of the passages and walls and by the depth of the precombustion chamber. It is intended that the combustion shall be definitely limited by the form and dimensions of the construction, so that the splash plate is kept hot and a prompt ignition and combustion started in the precombustion chamber, but that the main combustion shall take place subsequently within the cylinder combustion space. When the flow toward the cylinder begins on the reversal of the piston, there will be a flow of vapor and liquid from the precombustion chamber, and the combustion will sustain the pressure in the precombustion chamber D during this outflow to maintain a vigorous flow until all the fuel has been fed to the cylinder and consumed therein.

There may be a pressure rise in the precombustion chamber or not, according to the time of injection, but, if the injection be late and at or after dead center, while there may be no rise of pressure in the precombustion chamber, the required relative pressures between the precombustion chamber and the cylinder will be secured by the outward movement of the piston, co-acting with the combustion in the precombustion chamber acting to sustain the relative pressure therein, and thus the same or even better results be secured as compared with a rise of pressure in the precombustion chamber on earlier injection. In either case, I secure the graduated feed of fuel to the cylinder that is desired for producing a combustion which will be sustained for a considerable time with more or less constant pressure.

This method and construction makes possible the use of a very simple pump, operating at low pressures, the only pressure required being that sufficient to feed the stream of oil through the tube d against the splash plate. The nozzle, also, may be of the most simple form without complicated passages.

While the invention is shown as applied to a two-cycle engine, and with only a single precombustion chamber, the invention is equally applicable to engines operating on other cycles, and a plurality of precombustion chambers, each with its own oil injection and cylinder connection, may be used, any desired number being employed and positioned in such manner as to secure the desired distribution of the fuel throughout the cylinder combustion space. This plurality of precombustion chambers may be found important, especially in larger engines.

It will be understood, also, that the invention is not to be limited to the specific form or construction of devices shown, but many modifications may be made therein by those skilled in the art, while retaining the invention defined by the claims.

What is claimed is:

1. The method of feeding liquid or solid fuel to an internal combustion engine cylinder, which consists in compressing air in the engine cylinder and in a precombustion chamber having a restricted opening into the cylinder to ignition temperature, injecting fuel during or at the end of compression in a solid unbroken stream against a hot splash surface near the opening from the precombustion chamber into the cylinder, so as to secure combustion of only a limited portion of the injected fuel, and feeding the fuel to the cylinder by the flow of vapor and air from the precombustion chamber caused by relative pressures within the precombustion chamber and cylinder.

2. The method of feeding liquid or solid fuel to an internal combustion engine cylinder, which consists in compressing air in the engine cylinder and in a precombustion chamber having a restricted opening into the cylinder to ignition temperature, injecting fuel after the compression of the air to igniting temperature in a solid unbroken stream against a hot splash surface near the opening from the precombustion chamber into the cylinder and preventing contact of the fuel with a portion of the air in the precombustion chamber, and feeding the fuel to the cylinder by the flow of vapor and air from the precombustion chamber caused by relative pressures within the precombustion chamber and cylinder.

3. In an internal combustion engine, the combination with a precombustion chamber having a permanent restricted opening with the cylinder, of a splash plate near the cylinder opening, and means for injecting liquid or solid fuel in a solid unbroken stream against the splash surface after the compression of the air to igniting temperature.

4. In an internal combustion engine, the combination with a precombustion chamber having a permanent restricted opening with the cylinder, of a splash plate near the cylinder opening, a tube extending across the precombustion chamber from the opposite side toward the cylinder opening, and means for injecting liquid fuel through said tube in a solid unbroken stream against the splash surface after the compression of the air to igniting temperature.

5. In an internal combustion engine, the combination with a precombustion chamber having a permanent restricted opening with the cylinder, of a splash plate near the cylinder opening, means for injecting liquid or solid fuel in a solid unbroken stream against the splash surface, and a guard in the precombustion chamber limiting the amount of air in the precombustion chamber reached by the splashing back of the fuel.

6. In an internal combustion engine, the combination with a precombustion chamber having a permanent restricted opening with the cylinder, of a splash plate near the cylinder opening, a tube extending across the precombustion chamber from the opposite side toward the cylinder opening, means for injecting liquid fuel through said tube in a solid unbroken stream against the splash surface, and a guard on the tube end for limiting the amount of air in the precombustion chamber reached by the splashing back of the fuel.

7. In an internal combustion engine, the combination with a precombustion chamber having a permanent restricted opening with the cylinder, of a splash plate near the cylinder opening, a cup-shaped port plug in the cylinder carrying the restricted opening, and means for injecting liquid or solid fuel in a solid unbroken stream against the port plug.

8. In an internal combustion engine, the combination with a precombustion chamber having a permanent restricted opening with the cylinder, of a splash plate near the cylinder opening, a cup-shaped port plug in the cylinder carrying the restricted opening and expanded within the precombustion chamber to form an enlarged cup, and means for injecting liquid or solid fuel in a solid unbroken stream against the port plug.

9. The method of feeding liquid or solid fuel to an internal combustion engine cylinder, which consists in compressing air in the engine cylinder and in a precombustion chamber having a restricted opening into the cylinder to ignition temperature, injecting fuel after the compression of the air to igniting temperature against a hot splash surface near the opening from the precombustion chamber into the cylinder and preventing contact of the fuel with a portion of the air in the precombustion chamber, and feeding the fuel to the cylinder by the flow of vapor and air from the precombustion chamber caused by relative pressures within the precombustion chamber and cylinder.

10. In an internal combustion engine, the combination with a precombustion chamber having a permanent restricted opening with the cylinder, of a splash plate near the cylinder opening, and means for injecting liquid or solid fuel against the splash surface after the compression of the air to igniting temperature.

11. In an internal combustion engine, the combination with a precombustion chamber having a permanent restricted opening with the cylinder, of a splash plate near the cylinder opening, means for injecting liquid or solid fuel, and a guard in the precombustion chamber limiting the amount of air in the precombustion chamber reached by the splashing back of the fuel.

12. In an internal combustion engine, the combination with a precombustion chamber having a permanent restricted opening with the cylinder, of a splash plate near the cylinder opening, a cup-shaped port plug in the cylinder carrying the restricted opening, and means for injecting liquid or solid fuel against the port plug.

In testimony whereof, I have hereunto set my hand.

CHARLES E. LUCKE.